(12) United States Patent
Jäck et al.

(10) Patent No.: US 9,016,698 B2
(45) Date of Patent: Apr. 28, 2015

(54) SEAL AND ASSOCIATED SEALING ARRANGEMENT

(75) Inventors: Thomas Jäck, Fürth (DE); Hans Unger, Abtsteinach (DE); Ralf Heldmann, Wald-Michelbach (DE); Reiner Dirr, München (DE)

(73) Assignee: Carl Freudenberg KG, Weinheim (DE)

( * ) Notice: Subject to any disclaimer, the term of this patent is extended or adjusted under 35 U.S.C. 154(b) by 7 days.

(21) Appl. No.: 13/563,819

(22) Filed: Aug. 1, 2012

(65) Prior Publication Data

US 2013/0038028 A1 Feb. 14, 2013

(30) Foreign Application Priority Data

Aug. 8, 2011 (DE) .......................... 10 2011 109 675

(51) Int. Cl.

| | | |
|---|---|---|
| *F16J 15/02* | (2006.01) | |
| *F16L 21/035* | (2006.01) | |
| *F02M 35/10* | (2006.01) | |
| *F16L 27/10* | (2006.01) | |
| *F16J 15/06* | (2006.01) | |
| *F16L 21/02* | (2006.01) | |
| *F02B 33/44* | (2006.01) | |

(52) U.S. Cl.
CPC ........ *F16L 21/035* (2013.01); *F02M 35/10157* (2013.01); *F16L 27/1017* (2013.01); *F02M 35/10144* (2013.01); *F16J 15/061* (2013.01); *F16L 21/022* (2013.01); *F02B 33/44* (2013.01); *F16J 15/028* (2013.01); *Y02T 10/144* (2013.01); *F02M 35/10321* (2013.01)
USPC .......................................... 277/647; 277/654

(58) Field of Classification Search
USPC ......... 277/500, 504, 529, 534, 628, 644, 647, 277/650, 654, 614
See application file for complete search history.

(56) References Cited

U.S. PATENT DOCUMENTS

| | | | |
|---|---|---|---|
| 3,873,105 A * | 3/1975 | Wehner | ......................... 277/322 |
| 3,903,584 A | 9/1975 | Evans et al. | |
| 5,106,129 A | 4/1992 | Camacho et al. | |
| 6,905,144 B2 | 6/2005 | Vila | |
| 7,360,592 B2 * | 4/2008 | McMahan | ...................... 166/207 |
| 7,823,889 B2 | 11/2010 | Komukai et al. | |
| 8,490,409 B2 | 7/2013 | Pucovsky et al. | |
| 2007/0284828 A1 | 12/2007 | Komukai et al. | |

FOREIGN PATENT DOCUMENTS

| | | | |
|---|---|---|---|
| DE | 7004917 U | 5/1970 | |
| EP | 1024322 A2 * | 8/2000 | .............. F16L 21/03 |
| EP | 1201983 A2 | 5/2002 | |
| EP | 2157340 A1 | 2/2010 | |
| JP | 2003120327 A | 4/2003 | |
| JP | 2008223936 A | 9/2008 | |

OTHER PUBLICATIONS

Parker-Pradifa GmbH; PTFE-Dichtungen/Seals; 1992 (7 pages).

* cited by examiner

*Primary Examiner* — Gilbert Lee
(74) *Attorney, Agent, or Firm* — Harness, Dickey & Pierce, P.L.C.

(57) ABSTRACT

A seal including a tubular carrier body (1) and two annular sealing elements (2, 3), wherein the carrier body (1) on both sides of its front face is respectively enclosed by one of the sealing elements (2, 3) on the side of its outer perimeter forming a seal. At least one of the sealing elements (2, 3) is made of a non-elastomeric high-temperature resistant sealing material.

16 Claims, 6 Drawing Sheets

SEAL AND ASSOCIATED SEALING ARRANGEMENT

CROSS-REFERENCE TO RELATED APPLICATIONS

This application claims the benefit and priority of German Patent Application No. 10 2011 109 675.6, filed Aug. 8, 2011. The entire disclosure of the above application is incorporated herein by reference.

FIELD

The present disclosure relates to a seal comprising a tubular carrier body and two annular sealing elements, wherein the carrier body is respectively enclosed and sealed on both sides of its front face by one of the sealing elements on its outer perimeter.

BACKGROUND

Such seal is generally known and is developed as a plug-in piece, for example, for sealing two housing or pipe connections against media such as gases or liquids subjected to pressure and temperature. In this context, the sealing elements of the previously known seal consist of an elastomeric material. Sealing elements made of elastomeric material are not suitable for applications in which a seal is subjected to temperatures between 200° C. and 300° C., because elastomeric sealing elements will be damaged/destroyed when used at such high temperatures.

SUMMARY

The object of the disclosure is to further develop a seal of the previously known type such that it will also reliably seal at temperature ranges between 200° C. and 300° C. during extended use.

To solve this problem it is provided that at least one of the sealing elements consists of a non-elastomeric sealing material that is resistant against high temperatures. By using a non-elastomeric high-temperature resistant sealing material, the sealing element can also be used between 200° C. and 300° C. and will also have consistently good performance characteristics in this temperature range during extended use.

The term "high-temperature resistant" is to be understood as the durability of the sealing material at temperatures of more than 200° C.

Preferably both sealing elements each include a non-elastomeric high-temperature resistant sealing material. In this context it is an advantage that the entire seal can be used for sustained application in a temperature range of >200° C. Such conditions for example exist if the seal is used for intercooler systems in trucks or passenger cars. The seal will then reliably seal two housing or pipe connections against pressurized hot gases which flow through the intercooler system.

The sealing elements can include PTFE in each case. PTFE is a high-temperature resistant sealing material in the previously described context, which can even be used in temperature ranges of more than 200° C. up to approximately 300° C. with consistently good performance characteristics for extended use. In addition, PTFE is resistant for use as a seal against the majority of media.

The sealing elements can preferably be designed as interchangeable components. In this instance it is an advantage that the seal can be produced easily and cost-effectively overall. Because only one type of sealing element has to be produced and kept in inventory for a seal. By using interchangeable components, this limits the risk of assembly errors to a minimum during the production of the seal.

The sealing elements can be positively connected with the carrier body. Such positive fit can then be accomplished by sealing elements that are snapped into the outer perimeter of the carrier body. Contrary to the integral connection such as exists with a rubber/metal component, for example, including a carrier body and elastomeric sealing elements, a positive connection can be produced considerably easier and more cost-effective. By the positive connection between the sealing elements and the carrier body, also materials such as PTFE can be used without problems, because they can normally either not be connected at all or only poorly as an integral connection, because of their material characteristics.

The sealing elements can be snapped into the outer perimeter of the carrier body. This requires no complex assembly devices for the installation of the seal. The sealing elements are pushed over the outer perimeter of the carrier body with their face side and are then snapped into the adjacent undercut behind a detent lug in the outer perimeter of the carrier body, for example.

The sealing elements can each have an inner sealing lip, which encloses the outer perimeter of the carrier body forming a seal and in each case an outer sealing lip, wherein the outer sealing lips can be respectively placed against an internal perimeter of a machine element which surrounds the respective face side of the carrier body forming a seal. A static seal is formed by the inner sealing lips which are elastically prestressed and enclose the outer perimeter of the carrier body forming a seal. The elastic prestressing occurs during the installation by pushing the sealing elements onto the carrier body. The outer sealing lips on the other hand are transformed by means of a tool and are preferably calibrated at temperature. The seal against the two machine elements enclosing the carrier body occurs by means of low initial prestressing of the outer sealing lips, wherein this initial pretension is assisted by the memory effect of the sealing material during the designated use of the seal under the influence of temperature. The memory effect is referred to as the intrinsic properties of a material and the tendency of a transformed component to return into its form as manufactured.

The inner and the outer sealing lip of the respective sealing elements can be essentially C-shaped and designed so that they merge together and form a sealing lip arrangement in each case in the longitudinal sectional view of the seal.

The sealing lip arrangements can be respectively axially open in the direction of the respective face side of the carrier body which is enclosed by the respective sealing element. The simple geometry of the sealing lip arrangement can be produced easily and cost-effectively. In addition it is advantageous that an inner and an outer sealing lip, which are forming the sealing arrangement, are preferably designed so that they merge into each other as one piece, using the same material. As a result, the seal is designed simply with only a few parts and can be installed particularly easily.

The sealing elements can each have a backing for attachment on the carrier body, wherein the sealing lips are connected with the corresponding backing. The backing ensures the connection of the sealing elements with the carrier body.

Pursuant to a first embodiment, the backing can be formed by a backup ring/guide ring.

The backup ring/guide ring can be arranged on the side of the sealing lips facing away axially from the respective front face of the carrier body and be connected with it. The purpose of the backup ring/guide ring is not simply to accommodate both sealing lips. Each sealing element is held in its position relative to the carrier body through the backup ring/guide ring snapped into the outer perimeter of the carrier body. On the outer perimeter, the backup ring/guide ring serves for centering the seal in the two machine elements that are connected with each other by the seal forming a seal.

The backup ring/guide ring and the sealing lips can form one unit which is designed as one piece using the same material. Both the sealing lip arrangement, comprising an inner and an outer sealing lip, as well as also the backup ring/guide ring can then consist of a PTFE material, for example. As a result, the backup ring/guide ring is thus also high-temperature resistant, and because of the one-piece design a separate attachment of the sealing lip arrangement on the backup ring/guide ring is not required.

The backup ring/guide ring can be enclosed radially on its outside by an O-ring of elastomeric material.

The O-ring can be arranged in a fitting groove of the backup ring/guide ring which is radially open towards the outside. In this instance it is an advantage the static leak tightness is also ensured at particularly low temperatures.

Pursuant to another embodiment it can be provided that the backing is formed by a clamp ring.

Preferably, the clamp ring can be positioned radially between the inner and the outer sealing lip.

The clamp ring can essentially be designed L-shaped, including a metallic material and enclose the outer perimeter of the carrier body by inserting the inner sealing lip in-between. Also in this case it can be provided that the inner and the outer sealing lip of the respective sealing elements can be essentially C-shaped and designed so that they merge together and form a sealing lip arrangement, viewed in the longitudinal section of the seal. The clamp ring is provided for attaching such sealing lip arrangement on the outer perimeter of the carrier body. The inner sealing lip is pressed under elastic prestress against the outer perimeter of the carrier body by means of the clamp ring forming a seal, while the outer sealing lip bears sealing against the inner perimeter of the machine element to be sealed.

The clamp ring can be designed as a bracing spring which is effective in the radial direction. Such type of design is an advantage which is to be emphasized when forming a seal at cold temperatures. This ensures a particularly reliable seal even at temperatures in the freezing range.

The carrier body can consist of a metallic material. Carrier bodies made of such material are temperature resistant and can be produced easily and cost-effectively.

In a different version, the carrier body can also consist of a high-temperature resistant polymeric material. In this context it is an advantage that such carrier body is corrosion resistant.

The present disclosure moreover relates to a sealing arrangement, comprising a seal as described previously, wherein each sealing element is enclosed on its outer perimeter by a machine element in each case forming a seal, wherein the respective outer sealing lips of the sealing elements contact the inner perimeter of the respective machine element forming a seal. A sealing arrangement is a constituent part of an intercooler system of a truck or a passenger car, for example. The two machine elements are connected together by means of the seal.

DRAWINGS

Four embodiments of the seal as taught by the present disclosure and the sealing arrangement as taught by the present disclosure are described in detail below, with reference to FIGS. 1 to 4. These respectively show as a schematic representation.

DETAILED DESCRIPTION

FIGS. 1 to 4 each show an embodiment of a seal, wherein the seals are a constituent part of a sealing arrangement in each case.

In each of the embodiments shown here, the seal comprises a tubular carrier body 1, which is made of a metallic material. The carrier body 1 on its outside perimeter in the area of its two front faces 9, 10 in each case comprises a groove-shaped recess which is open towards the outside in the radial direction, in which the respective annular sealing elements 2, 3 are arranged. The sealing elements 2, 3 in each case enclose the carrier body 1 forming a seal.

The sealing arrangements shown here are used in intercooler systems of trucks or passenger cars. For this application, it is necessary that the materials used are high-temperature resistant. By "high-temperature resistant" it is to be understood that the materials used are resistant up to at least 300° C.

For this reason, elastomeric materials must be excluded for use as annular sealing elements 2, 3.

In the embodiments shown here, the sealing elements 2, 3 are made of PTFE in each case, i.e. of a non-elastomeric sealing material which is high-temperature resistant.

Each sealing element 2, 3 has a radial inner sealing lip 5.1, 5.2, which encloses the outer perimeter 4 of the carrier body 1 forming a seal. In addition, the sealing elements 2, 3 encompass outer sealing lips 6.1, 6.2 radially, wherein these radial outer sealing lips 6.1, 6.2 contact the internal perimeter 7, 8 of the machine elements 11, 12 forming a seal, and wherein the machine elements 11, 12 enclose the carrier body 1 on the side of its outer perimeter. The inner and the outer sealing lips 5.1, 6.1; 5.2, 6.2 are designed C-shaped merging together and using the same material, and are respectively open axially in the direction of the corresponding front face 9, 10.

Figure 1:
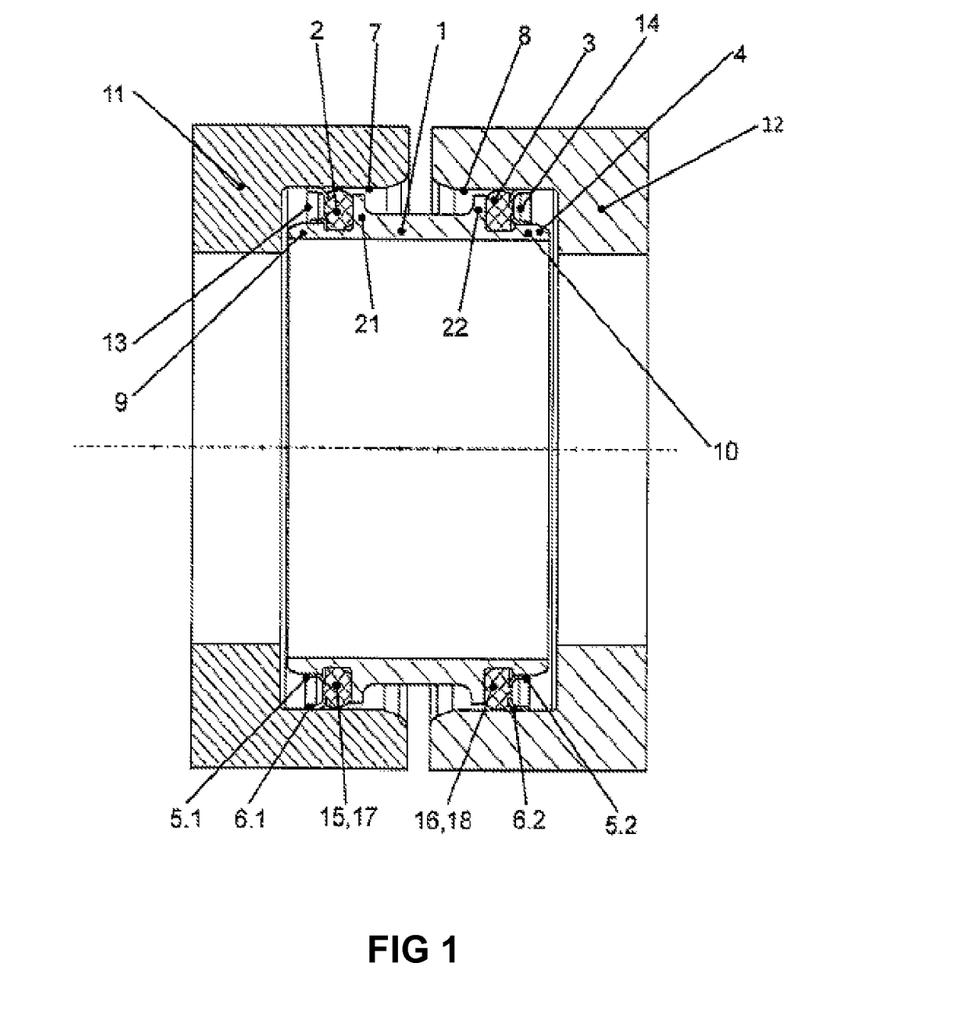
FIG. 1 is a first embodiment of a seal as taught by the present disclosure in a sealing arrangement as taught by the present disclosure, in which the carrier bodies are formed by backup rings/guide rings, wherein the sealing lips of the sealing elements are connected with the backup rings/guide rings in one piece.

FIG. 1 illustrates a first embodiment. The assembly of the sealing elements 2, 3 on the carrier body 1 is performed such that the sealing elements 2, 3 are pushed onto the outer perimeter 4 of the bearing body 1 in the axial direction, starting from the respective front face 9, 10, until they positively snap into the groove-shaped recess in the outer perimeter 4 of the bearing body 1. In this context, due to the assembly, the inner sealing lips 5.1, 5.2 are placing themselves in the correct position onto the outer perimeter 4 of the carrier body 1 forming a seal. The respective outer lips 6.1, 6.2 are transformed by means of an assembly tool, so that the machine elements 11, 12 can be installed above the transformed sealing lips 6.1, 6.2. During the designated use, the outer sealing lips 6.1 6.2 also bear against the internal perimeter 7, 8 of the respective machine elements 11, 12, forming a seal.

The sealing lip arrangements 13, 14 which are formed by the sealing lips 5.1, 6.1; 5.2, 6.2, are fixed on the backings 15, 16, wherein the backings 15, 16 are formed by backup rings/guide rings 17, 18 in the embodiment shown. The backup rings/guide rings 17, 18 are designed as one piece merging together and have the same material as the sealing lips 5.1, 6.1; 5.2, 6.2, so that the backup rings/guide rings 17, 18 in the embodiment shown also consist of PTFE.

Radially on the inside, the backup rings/guide rings 17, 18 are arranged under elastic prestressing onto the outer perimeter 4 of the carrier body 1; the backup rings/guide rings 17, 18 radially on the outside are assigned adjacently to the internal perimeter 7, 8 of the respective machine elements 11, 12, either with a small radial spacing, or the backup rings/guide rings 17, 18 contact the respective internal perimeter 7, 8, bearing against it only loosely. By this small radial distance or by the assignment of the backup rings/guide rings 17, 18 bearing loosely against the respective internal perimeter 7, 8, it is possible to compensate for thermal expansion during operation, without leaks occurring in the area of the outer sealing lips 6.1, 6.2. The outer perimeter of the backup rings/guide rings 17, 18 moreover serves for centering the seal in the machine elements 11, 12. Deviations of the installation space due to manufacture, such as an axial offset or an inclined position of the components relative to one another, can be compensated thereby.

Figure 2:
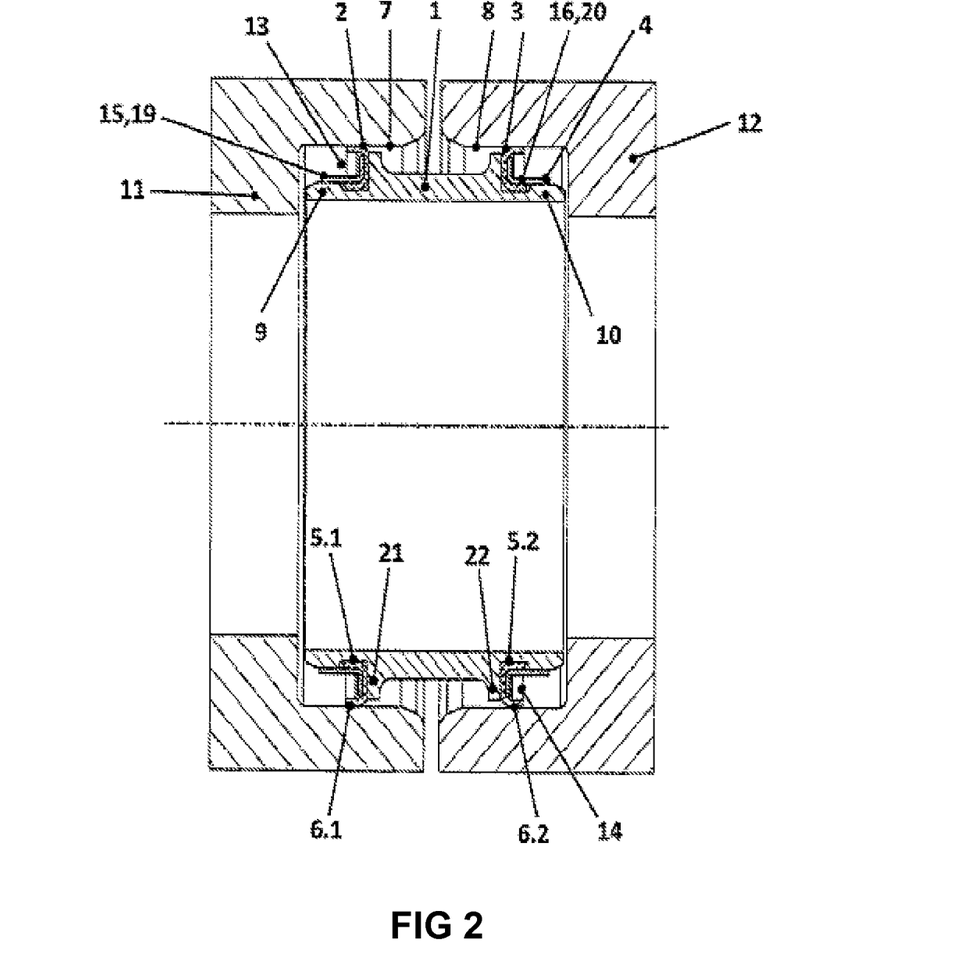
FIG. 2 is a second embodiment of the seal as taught by the present disclosure in a sealing arrangement as taught by the present disclosure, wherein the backings are formed by clamp rings, which fix the sealing lips on the carrier body.

FIG. 2 shows a second embodiment of a sealing arrangement with a seal, which differs from the embodiment pursuant to FIG. 1 in that the backings 15, 16 are formed by clamp rings 19, 20. The clamp rings 19, 20 consist of a metallic material, are arranged in a radial direction between the inner 5.1, 5.2 and the outer sealing lips 6.1, 6.2, and clamp the inner sealing lips 5.1, 5.2 onto the outer perimeter 4 of the carrier body 1 forming a seal.

Both the backup rings/guide rings 17, 18 from the embodiment in FIG. 1 as well as also the clamp rings 19, 20 from the embodiment from FIG. 2 ensure additional sealing on the radial flanges 21, 22 of the carrier body 1.

In FIG. 1 the backup rings/guide rings 17, 18 consisting of the sealing material contact the corresponding radial flanges 21, 22; in FIG. 2, the clamp rings 19, 20 ensure that the transition zones of the sealing lip arrangements 13, 14 between the inner sealing lips 5.1, 5.2 and the outer sealing lips 6.1, 6.2 are pressed under axial prestressing against the radial flanges 21, 22, forming a seal.

Figure 3:
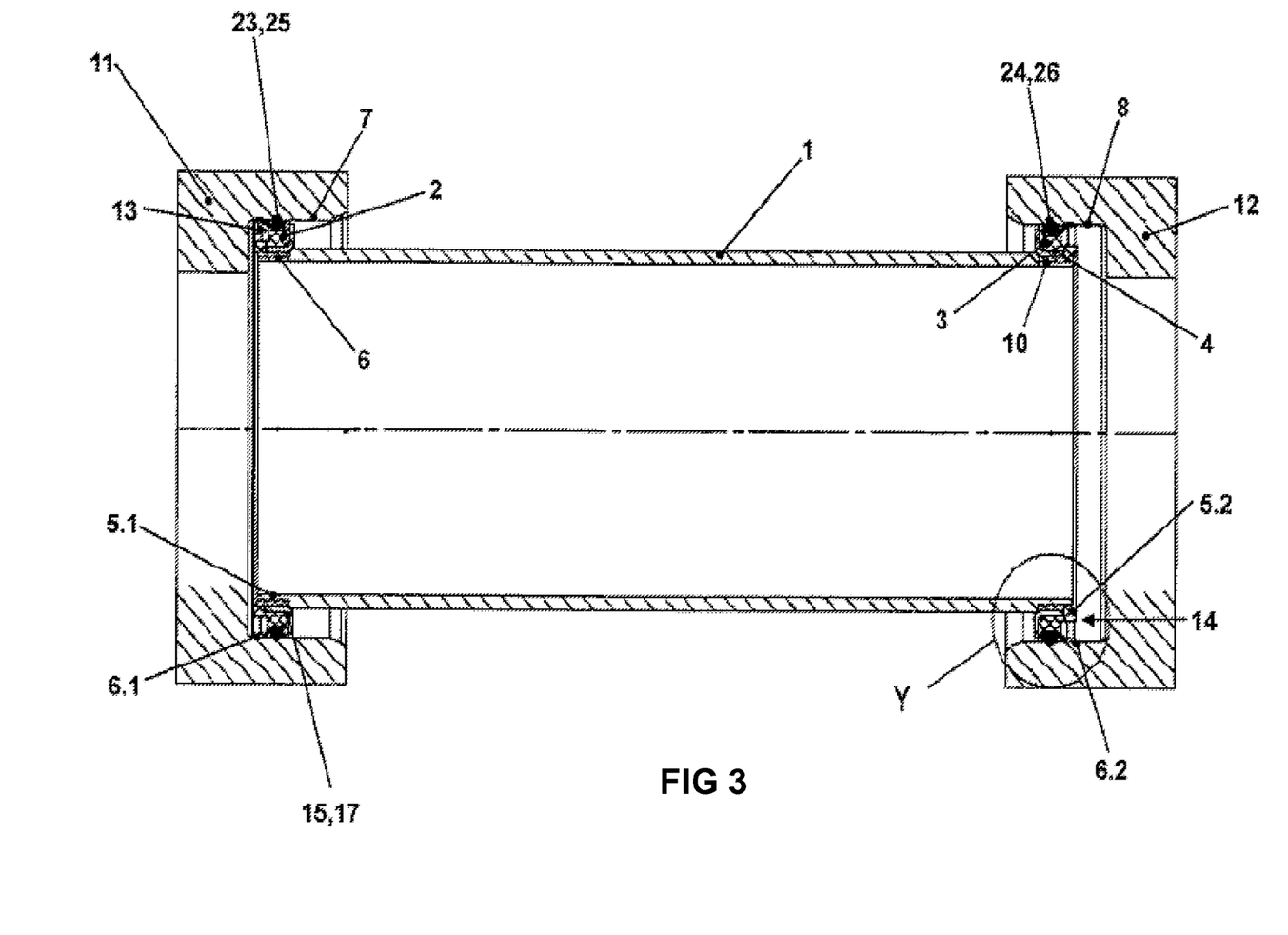
FIGS. 3 and 3A are a third embodiment of a seal as taught by the present disclosure in a sealing arrangement as taught by the present disclosure, wherein the backup rings/guide rings are respectively enclosed radially on the outside by an O-ring of elastomeric material.
Figure 3A:
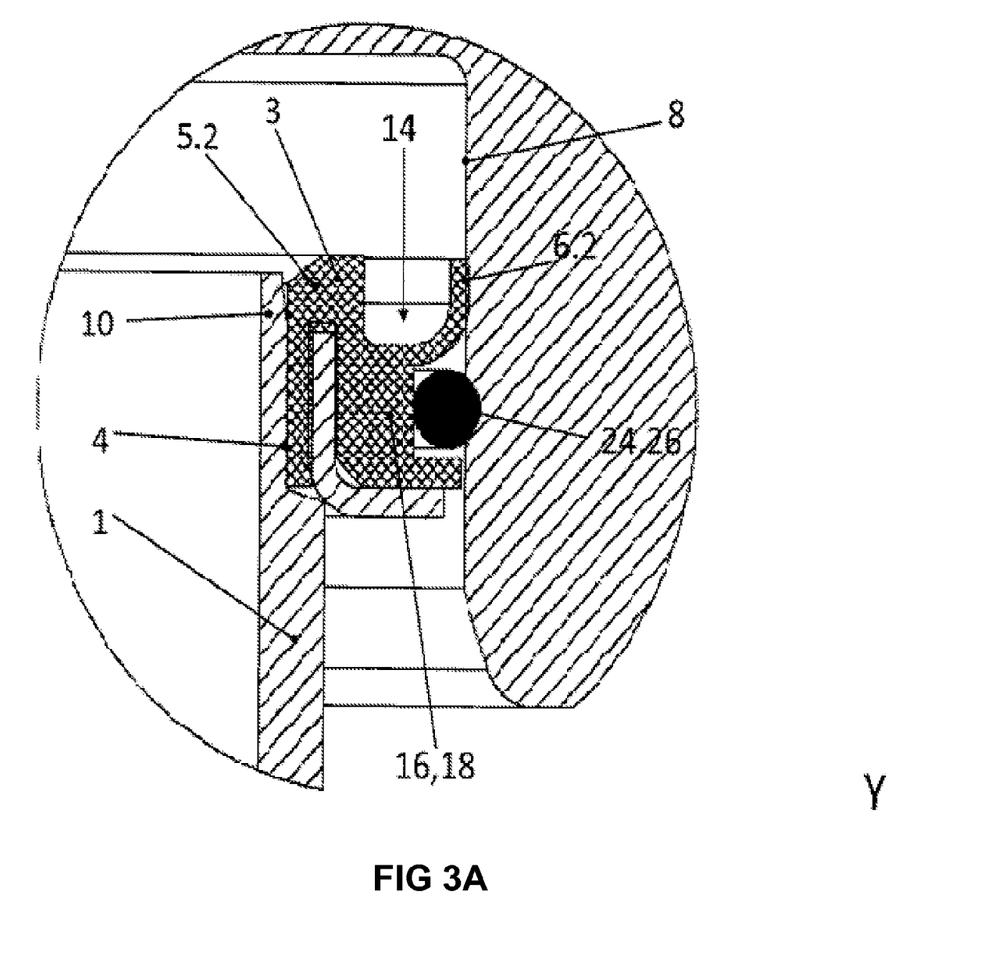

FIGS. 3 and 3A show a third embodiment of a seal as taught by the present disclosure in a sealing arrangement as taught by the present disclosure, wherein the backup rings/guide rings 17, 18 are respectively enclosed radially on the outside by an O-ring 23, 24 of elastomeric material. The O-rings 23, 24 are respectively arranged in a fitting groove 25, 26 of the backup ring/guide ring 17, 18, facing radially towards the outside and are sealing against the machine elements 11, 12. This ensures a particularly reliable seal even at temperatures in the freezing range.

Figure 4:
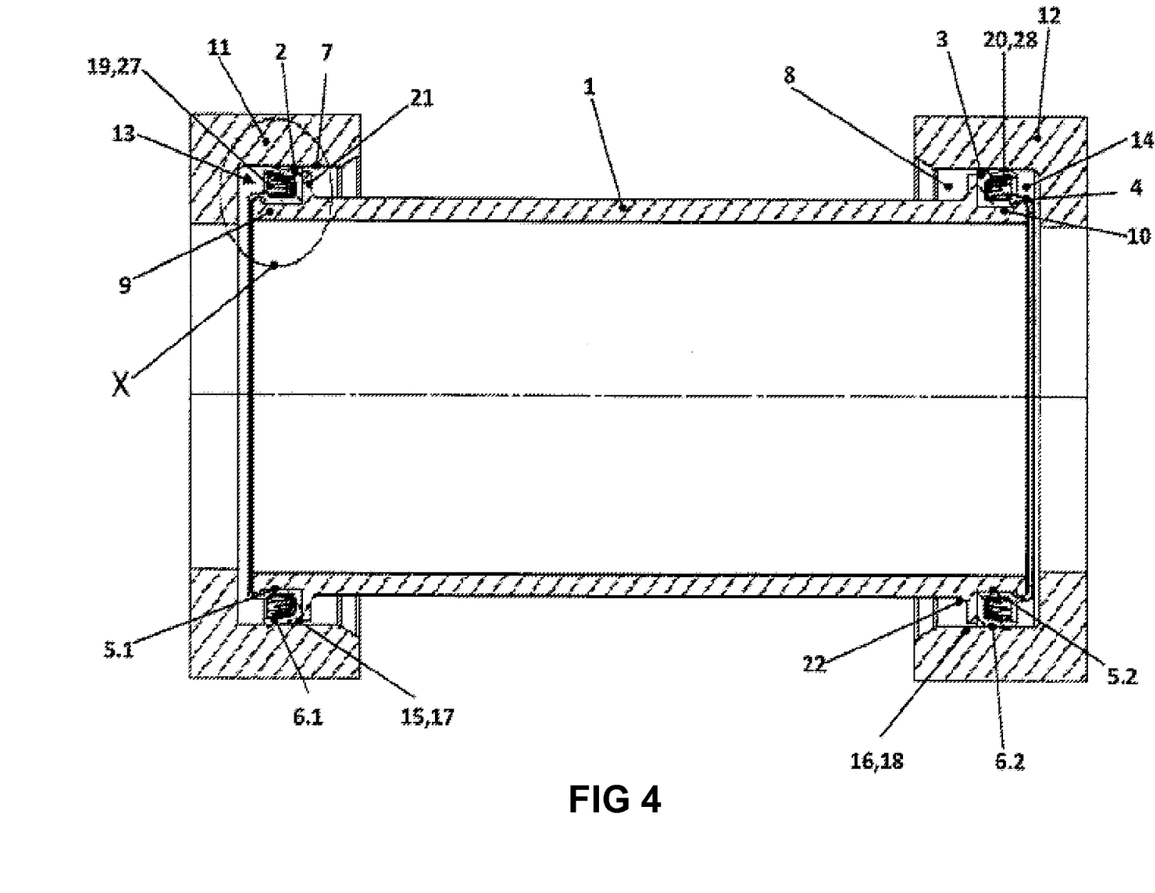
FIGS. 4 and 4A are a fourth embodiment of a seal as taught by the present disclosure in a sealing arrangement as taught by the present disclosure, wherein the clamp rings are designed as bracing springs which are effective in the radial direction.
Figure 4A:
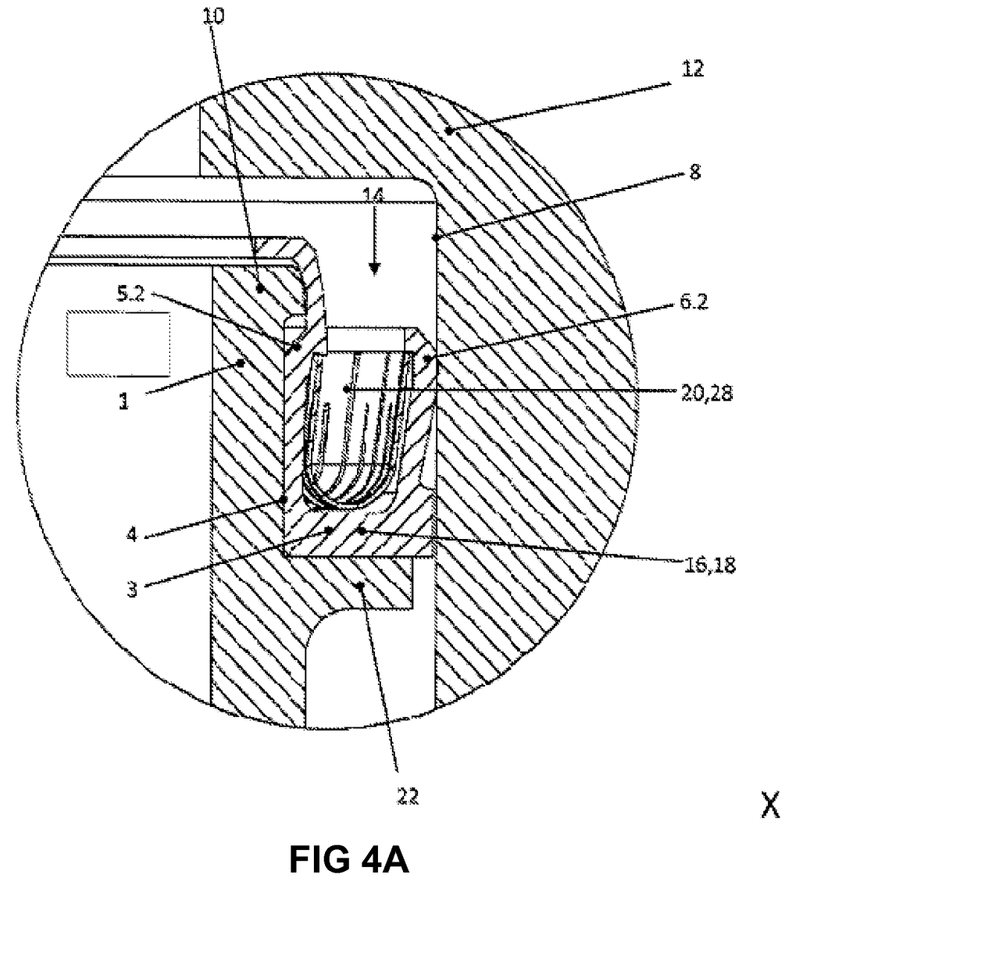

FIGS. 4 and 4A show a fourth embodiment of a seal as taught by the present disclosure in a sealing arrangement as taught by the present disclosure, wherein the seal from FIG. 4 essentially differs from the embodiment pursuant to FIG. 2 by the form of the clamp rings 19, 20. In FIG. 4, the clamp rings 19, 20 are respectively designed as bracing springs 27, 28, which, when viewed as a cross-section, are essentially formed C-shaped, corresponding to the respective associated sealing lip arrangements 13, 14. The bracing springs 27, 28 ensure that the sealing lips 5.1, 6.1; 5.2, 6.2 of the respective sealing lip arrangements 13, 14 are expanded in the radial direction, to thereby accomplish an improved force against the surfaces to be sealed and thereby achieve improved sealing. This expansion is a notable positive effect in particular for sealing at cold temperatures. This ensures a reliable seal even at temperatures in the freezing range.

In the embodiment shown here, the respective inner sealing lips 5.1, 5.2 are respectively extended in the direction of the respective adjacent front faces 9, 10 of the carrier body 1 and in the radial direction are pulled around the front faces 9, 10 towards the inside. This ensures that the front faces 9, 10 of the carrier body 1 will not directly contact the respective axially adjacent machine elements 11, 12.

Such shielding of the front faces 9, 10 of the carrier body 1 from the machine elements 11, 12 through the extended inner sealing lips 5.1, 5.2 which are radially pulled around towards the inside can also be used with the other embodiments pursuant to FIG. 1 to FIG. 3.

LIST OF REFERENCE SYMBOLS

Carrier body
Sealing element
Sealing element
Outer perimeter of 1
5.1 Inner sealing lip
5.2 Inner sealing lip
6.1 Outer sealing lip
6.2 Outer sealing lip
7 Internal perimeter of the first machine element
8 Internal perimeter of the second machine element
9 Front face of 1
10 Front face of 1
11 First machine element
12 Second machine element
13 First sealing lip arrangement
14 Second sealing lip arrangement
15 Backing of 2
16 Backing of 3
17 Backup ring/guide ring
18 Backup ring/guide ring
19 Clamp ring
20 Clamp ring
21 Radial flange
22 Radial flange
23 O-ring
24 O-ring
25 Fitting groove
26 Fitting groove
27 Bracing spring
28 Bracing spring

What is claimed is:

1. A seal, comprising a tubular carrier body (1) and two annular sealing elements (2, 3), wherein the carrier body (1) is respectively enclosed on both sides of the front face by one of the sealing elements (2, 3) on the side of its outer perimeter forming a seal, wherein at least one of the sealing elements (2, 3) includes a non-elastomeric, high-temperature resistant sealing, wherein the two annular sealing elements (2, 3) respectively comprise an inner sealing lip (5.1, 5.2) which encloses the outer perimeter (4) of the carrier body (1) and are each disposed in a groove having a pair of opposing shoulders formed in the outer perimeter of the carrier body for forming a seal and respectively one outer sealing lip (6.1, 6.2) and that the outer sealing lips (6.1, 6.2) can respectively be placed against an internal perimeter (7, 8) of a machine element (11, 12) which encloses the respective front face (9, 10) of the carrier body (1) forming a seal, wherein the inner sealing lips (5.1, 5.2) of the two annular sealing elements (2, 3) extend beyond and overlap an end face of the carrier body (10).

2. The seal according to claim 1, wherein the inner (5.1, 5.2) and the outer sealing lip (6.1, 6.2) of the respective sealing elements (2, 3) when viewed as a longitudinal cross-section of the seal are essentially C-shaped and are merging together and respectively form a sealing lip arrangement (13, 14).

3. The seal according to claim 1, wherein the sealing lip arrangements (13, 14) are respectively open axially in a direction of the corresponding front face (9, 10) of the carrier body (1), which is enclosed by the respective sealing element (2, 3).

4. The seal according to claim 1, wherein the sealing elements (2, 3) respectively comprise a backing (15, 16) for attachment on the carrier body (1) and that the sealing lips (5.1, 6.1; 5.2, 6.2) are connected with the corresponding backing (15, 16).

5. The seal according to claim 4, wherein the backing (15, 16) is formed by a backup ring/guide ring (17, 18).

6. The seal according to claim 5, wherein the backup ring/guide ring (17, 18) is arranged on the side of the sealing lips (5.1, 6.1; 5.2, 6.2) which is axially facing away from the respective front face (9, 10) of the carrier body (1) and is connected with these.

7. The seal according to claim 5, wherein the backup ring/guide ring (17, 18) and the sealing lips (5.1, 6.1; 5.2, 6.2) are designed in one piece and are made of the same material.

8. The seal according to claim 4, wherein the backing (15, 16) is formed by a clamp ring (19, 20).

9. The seal according to claim 8, wherein the clamp ring (19, 20) is arranged radially between the inner (5.1, 5.2) and the outer sealing lip (6.1, 6.2).

10. The seal according to claim 8, wherein the clamp ring (19, 20) is essentially formed L-shaped, consists of a metallic material and encloses the outer perimeter (4) of the carrier body (1) by inserting the inner sealing lip (5.1, 5.2) in-between.

11. The seal according to claim 8, wherein the clamp ring (19, 20) is designed as a bracing spring (27, 28) that is effective in the radial direction.

12. The seal according to claim 1, wherein the carrier body (1) consists of a metallic material.

13. A sealing arrangement, comprising a seal according to claim 1, wherein each sealing element (2, 3) is respectively enclosed by one machine element (11, 12) on the side of its outer perimeter forming a seal and that the respective outer sealing lips (6.1, 6.2) of the sealing elements (2, 3) contact the internal perimeter (7, 8) of the respective machine element (11, 12) forming a seal.

14. A seal, comprising a tubular carrier body (1) and two annular sealing elements (2, 3), wherein the carrier body (1) is respectively enclosed on both sides of the front face by one of the sealing elements (2, 3) on the side of its outer perimeter forming a seal, wherein at least one of the sealing elements (2, 3) includes a non-elastomeric, high-temperature resistant sealing,
   wherein the two annular sealing elements (2, 3) respectively comprise an inner sealing lip (5.1, 5.2) which encloses the outer perimeter (4) of the carrier body (1) and are each disposed in a groove having a pair of opposing shoulders formed in the outer perimeter of the carrier body for forming a seal and respectively one outer sealing lip (6.1, 6.2) and that the outer sealing lips (6.1, 6.2) can respectively be placed against an internal perimeter (7, 8) of a machine element (11, 12) which encloses the respective front face (9, 10) of the carrier body (1) forming a seal,
   wherein the sealing elements (2, 3) respectively comprise a backing (15, 16) for attachment on the carrier body (1) and that the sealing lips (5.1, 6.1; 5.2, 6.2) are connected with the corresponding backing (15, 16),
   wherein the backing (15, 16) is formed by a backup ring/guide ring (17, 18), wherein the backup ring/guide ring (17, 18) is radially enclosed on the outside by an O-ring (23, 24) made of an elastomeric material.

15. The seal according to claim 14, wherein the O-ring (23, 24) is arranged in a fitting groove (25, 26) of the backup ring/guide ring (17, 18) which is radially open towards the outside.

16. A seal, comprising a tubular carrier body (1) and two annular sealing elements (2, 3), wherein the carrier body (1) is respectively enclosed on both sides of the front face by one of the sealing elements (2, 3) on the side of its outer perimeter forming a seal, wherein at least one of the sealing elements (2, 3) includes a non-elastomeric, high-temperature resistant sealing,
   wherein the two annular sealing elements (2, 3) respectively comprise an inner sealing lip (5.1, 5.2) which encloses the outer perimeter (4) of the carrier body (1) and are each disposed in a groove having a pair of opposing shoulders formed in the outer perimeter of the carrier body for forming a seal and respectively one outer sealing lip (6.1, 6.2) and that the outer sealing lips (6.1, 6.2) can respectively be placed against an internal perimeter (7, 8) of a machine element (11, 12) which encloses the respective front face (9, 10) of the carrier body (1) forming a seal,
   wherein the sealing elements (2, 3) respectively comprise an L-shaped clamp ring (19, 20) for attachment on the carrier body (1) and that the sealing lips (5.1, 6.1; 5.2, 6.2) are connected with the corresponding backing (15, 16), wherein the L-shaped clamp ring (19, 20) consists of a metallic material and encloses the outer perimeter (4) of the carrier body (1) by inserting the inner sealing lip (5.1, 5.2) in-between the clamp ring and the outer perimeter (4) of the carrier body (1).

* * * * *